United States Patent
Liu et al.

(10) Patent No.: US 10,336,046 B2
(45) Date of Patent: Jul. 2, 2019

(54) SELF-ADHERING TAPE COMPRISING MULTILAYERS OF POLYOLEFIN POLYMER MATERIALS AND METHOD

(71) Applicant: 3M INNOVATIVE PROPERTIES COMPANY, St. Paul, MN (US)

(72) Inventors: Richard Y. Liu, Woodbury, MN (US); Stephen A. Johnson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 354 days.

(21) Appl. No.: 14/649,350

(22) PCT Filed: Feb. 11, 2014

(86) PCT No.: PCT/US2014/015737
§ 371 (c)(1),
(2) Date: Jun. 3, 2015

(87) PCT Pub. No.: WO2014/130290
PCT Pub. Date: Aug. 28, 2014

(65) Prior Publication Data
US 2015/0343750 A1 Dec. 3, 2015

Related U.S. Application Data

(60) Provisional application No. 61/767,456, filed on Feb. 21, 2013.

(51) Int. Cl.
*B29L 9/00* (2006.01)
*B32B 7/06* (2019.01)
(Continued)

(52) U.S. Cl.
CPC .............. *B32B 27/32* (2013.01); *B29C 48/18* (2019.02); *B32B 7/06* (2013.01); *B32B 7/12* (2013.01);
(Continued)

(58) Field of Classification Search
None
See application file for complete search history.

(56) References Cited

U.S. PATENT DOCUMENTS

| | | |
|---|---|---|
| 3,645,992 A | 2/1972 | Elston |
| 4,152,387 A | 5/1979 | Cloeren |

(Continued)

FOREIGN PATENT DOCUMENTS

| | | |
|---|---|---|
| DE | WO 2011-091132 | 7/2011 |
| JP | 2007/091903 | 4/2007 |
| JP | 2010-013508 | 1/2010 |

OTHER PUBLICATIONS

Min Zhao, Handbook of Plastics Toxicity and Safety, Chemical Industry Press of China, Oct. 2004, p. 3.
(Continued)

*Primary Examiner* — Victor S Chang
(74) *Attorney, Agent, or Firm* — Jeffrey M. Olofson

(57) ABSTRACT

A self-adhering tape is described comprising a substrate layer having a first major surface and opposing major surface; an adhesive layer disposed on the first major surface of the polyolefin substrate, the adhesive layer comprising a polyolefin polymer and optionally further comprising a tackifying resin; an outer layer disposed on the opposing major surface of the polyolefin substrate, the outer layer comprising a polymer comprising at least 50 wt-% $C_2$-$C_3$ alkylene and at least 20 wt-% $C_4$-$C_{20}$ α-olefin. The self-
(Continued)

adhering tape is suitable for use as a grip tape or an electrical tape. Methods of making and using the tape are also described.

16 Claims, 2 Drawing Sheets

(51) Int. Cl.

| | |
|---|---|
| *C09J 7/24* | (2018.01) |
| *B32B 27/32* | (2006.01) |
| *B32B 27/18* | (2006.01) |
| *B32B 37/14* | (2006.01) |
| *B32B 37/18* | (2006.01) |
| *B32B 37/12* | (2006.01) |
| *B29C 48/18* | (2019.01) |
| *B32B 7/12* | (2006.01) |
| *B32B 27/08* | (2006.01) |
| *B32B 27/36* | (2006.01) |
| *C09J 7/38* | (2018.01) |
| *C09J 7/29* | (2018.01) |
| *C08J 5/18* | (2006.01) |
| *C09J 123/08* | (2006.01) |

(52) U.S. Cl.
CPC ............. *B32B 27/08* (2013.01); *B32B 27/18* (2013.01); *B32B 27/36* (2013.01); *B32B 37/12* (2013.01); *B32B 37/142* (2013.01); *B32B 37/182* (2013.01); *C08J 5/18* (2013.01); *C09J 7/243* (2018.01); *C09J 7/29* (2018.01); *C09J 7/38* (2018.01); *B29L 2009/00* (2013.01); *B32B 2307/51* (2013.01); *B32B 2307/538* (2013.01); *B32B 2307/54* (2013.01); *B32B 2307/748* (2013.01); *B32B 2405/00* (2013.01); *C09J 123/0815* (2013.01); *C09J 2201/122* (2013.01); *C09J 2201/162* (2013.01); *C09J 2201/606* (2013.01); *C09J 2400/22* (2013.01); *C09J 2423/00* (2013.01); *C09J 2423/006* (2013.01); *C09J 2423/04* (2013.01); *C09J 2467/005* (2013.01); *C09J 2483/005* (2013.01); *Y10T 428/1452* (2015.01); *Y10T 428/24355* (2015.01); *Y10T 428/2848* (2015.01)

(56) References Cited

U.S. PATENT DOCUMENTS

| | | | | |
|---|---|---|---|---|
| 4,197,069 | A | | 4/1980 | Cloeren |
| 4,268,334 | A | * | 5/1981 | Harris .................... B65H 81/08 138/144 |
| 4,379,806 | A | | 4/1983 | Korpman |
| 4,600,550 | A | | 7/1986 | Cloren |
| 4,619,802 | A | | 10/1986 | Cloeren |
| 4,780,258 | A | | 10/1988 | Cloeren |
| 4,789,513 | A | | 12/1988 | Cloeren |
| 4,937,299 | A | | 6/1990 | Ewen |
| 5,218,017 | A | * | 6/1993 | Doucet .................... C08J 3/226 523/351 |
| 5,218,071 | A | | 6/1993 | Tsutsui |
| 5,272,236 | A | | 12/1993 | Lai |
| 5,278,272 | A | | 1/1994 | Lai |
| 5,660,922 | A | | 8/1997 | Herridge |
| 5,882,753 | A | | 3/1999 | Pedginski |
| 6,348,249 | B2 | | 2/2002 | Meyer |
| 6,777,053 | B1 | | 8/2004 | Gunter |
| 7,524,911 | B2 | * | 4/2009 | Karjala ................... A61L 15/58 524/543 |
| 7,589,145 | B2 | | 9/2009 | Brant |
| 8,041,838 | B2 | | 10/2011 | Kasamura |
| 2005/0031822 | A1 | | 2/2005 | Aihara |
| 2010/0151222 | A1 | | 6/2010 | Kremers |
| 2011/0039069 | A1 | | 2/2011 | Igawa |
| 2011/0143134 | A1 | | 6/2011 | Emslander |
| 2011/0316203 | A1 | * | 12/2011 | Emslander ................ B32B 7/12 264/485 |
| 2012/0321884 | A1 | | 12/2012 | Kido |
| 2013/0309426 | A1 | | 11/2013 | Thai |

OTHER PUBLICATIONS

Songchao Tang, et al, Molding and Processing of Polymer Materials (3$^{rd}$ Edition), China Light Industry Press, May 2013, pp. 11-12.
Affinity 1140 Resin (Table2), 1 Page.
Affinity 1140 Resin, Dow Affinity™ PF 1140 Polyolefin Plastomer, 1 Page.
Engage 8842, Dow Engage® 8842 Polyolefin Elastomer, 1 Page.
Poon, "Structure and Properties of Homogeneous Copolymers of Propylene and 1-Hexene", Macromolecules, 2005, vol. 38, pp. 1232-1243.
RegalRez 1094 Hydrocarbon Resin, 1 Page.
Shan, "Development of Olefin Block Copolymers for Pressure Sensitive Adhesives", Adapted from the paper presented at PSTC, May 16-18, 2007, 19 pages.
International Search Report for PCT International Application for PCT/US2014/015737 dated Oct. 1, 2014, 5 pages.

* cited by examiner

SELF-ADHERING TAPE COMPRISING MULTILAYERS OF POLYOLEFIN POLYMER MATERIALS AND METHOD

CROSS REFERENCE TO RELATED APPLICATIONS

This application is a national stage filing under 35 U.S.C. 371 of PCT/US2014/015737, filed Feb 11, 2014, which claims priority to U.S. Provisional Application Ser. No. 61/767,456, filed Feb. 21, 2013, the disclosure of which is incorporated by reference in its/their entirety herein.

SUMMARY

In one embodiment, a self-adhering tape is described comprising a substrate layer having a first major surface and opposing major surface; an adhesive layer disposed on the first major surface of the polyolefin substrate, the adhesive layer comprising a polyolefin polymer and optionally further comprising a tackifying resin; an outer layer disposed on the opposing major surface of the polyolefin substrate, the outer layer comprising a polymer comprising at least 50 wt-% $C_2$-$C_3$ alkylene and at least 20 wt-% $C_4$-$C_{20}$ α-olefin.

The self-adhering tape is suitable for use as a grip tape or an electrical tape.

In another embodiment, a method of using the self-adhering tape described herein. The method comprises providing an article; wrapping the self-adhering tape onto the article such that the adhesive layer contacts both the article and the outer layer. In some embodiments, the method further comprises actively or latently heating the wrapped article to fuse the adhesive layer and the outer layer.

In other embodiments, methods of making a tape are described wherein some or all of the layers are coextruded. In one embodiment, the method comprises providing a substrate composition comprising a polyolefin polymer, providing an adhesive composition comprising a polyolefin polymer and optionally further comprising a tackifying resin, providing a release composition comprising a polyester polymer; and coextruding the substrate, adhesive, and release compositions to form a multilayer tape wherein the adhesive composition is disposed between the substrate composition and release composition. When the tape is a self-adhering tape, the method further comprises coextruding an outer layer composition such that the substrate is disposed between the adhesive composition and outer layer composition.

DETAILED DESCRIPTION

Figure 1:
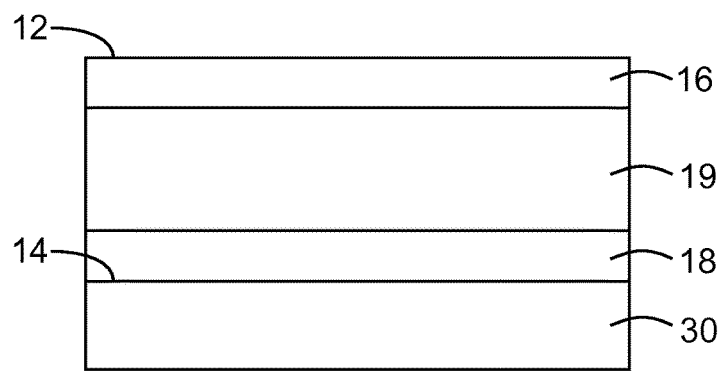
FIGS. 1-4 depict schematic cross sections of various embodiments of a self-adhering tape.

In one embodiment, as depicted in FIG. 1 the tape comprises a removable release layer 30, an adhesive layer 18 disposed upon a major surface 14 of the removable release layer 30, a substrate layer 19 disposed upon the adhesive layer 18, and an outer layer 16 disposed on the substrate layer. The outer layer 16 has a relatively smooth planar surface 12.

Figure 2:
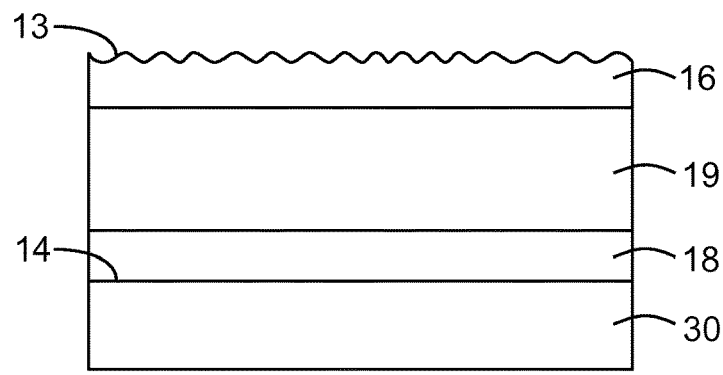

In another embodiment, depicted in FIG. 2 the tape comprises a removable release layer 30, an adhesive layer 18 disposed upon a major surface 14 of the removable release layer 30, a substrate layer 19 disposed upon the adhesive layer 18, and an outer layer 16 disposed on the substrate layer 19. The outer layer 16 has structured surface 13. The structured surface can reduce the surface area of the outer layer that comes in contact layer with another layer (such as the adhesive layer) when the tape in provided as a roll good.

Figure 3:
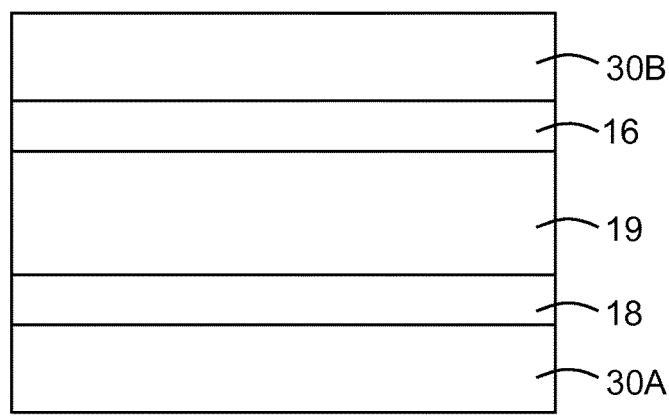

In another embodiment, depicted in FIG. 3 the tape comprises a removable release layer 30A, an adhesive layer 18 disposed upon a major surface of the release layer 30A, a substrate layer 19 disposed upon the adhesive layer 18, outer layer 16 disposed on the substrate layer 19, and a removable release layer 30B covering the surface (12 or 13) of outer layer 16.

Figure 4:
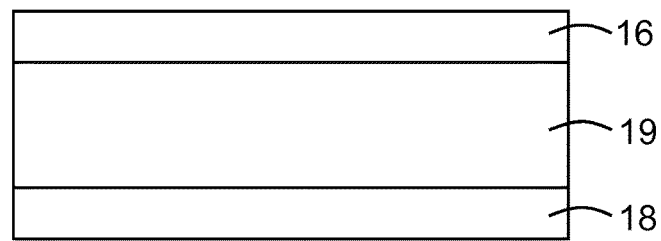
Figure 5:
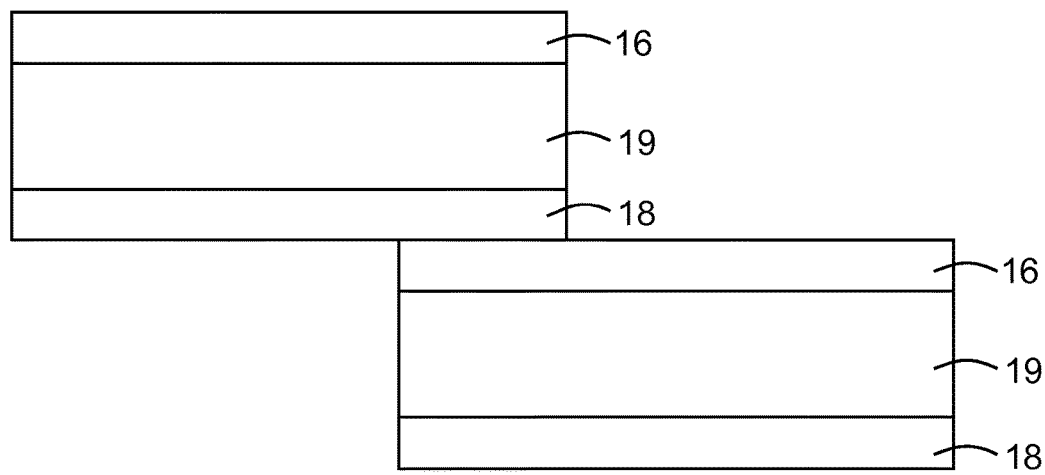
FIG. 5 depicts schematically two layers of a self-adhering tape.

In the embodiments depicted in FIG. 1-3, the adhesive is typically a pressure sensitive adhesive. During use the release layer(s) is/are removed from the tape article. For example, FIG. 4 depicts a single layer of the tape of FIG. 1 or FIG. 3 after the release layer(s) have been removed. When the tape is utilized as a self-adhering tape, the adhesive layer 18 is contacted with the article being wrapped (such as a handle of a hammer). The tape is then wound about such that at least a portion of the adhesive layer 18 contacts the outer layer 16 as depicted in FIG. 5. Although, the outer layer 16 may temporarily be covered with a removable release layer, as depicted in FIG. 3, this outer layer 16 forms an exposed outer surface layer after the tape has been applied to an article and the removable release layer has been removed.

Figure 6:
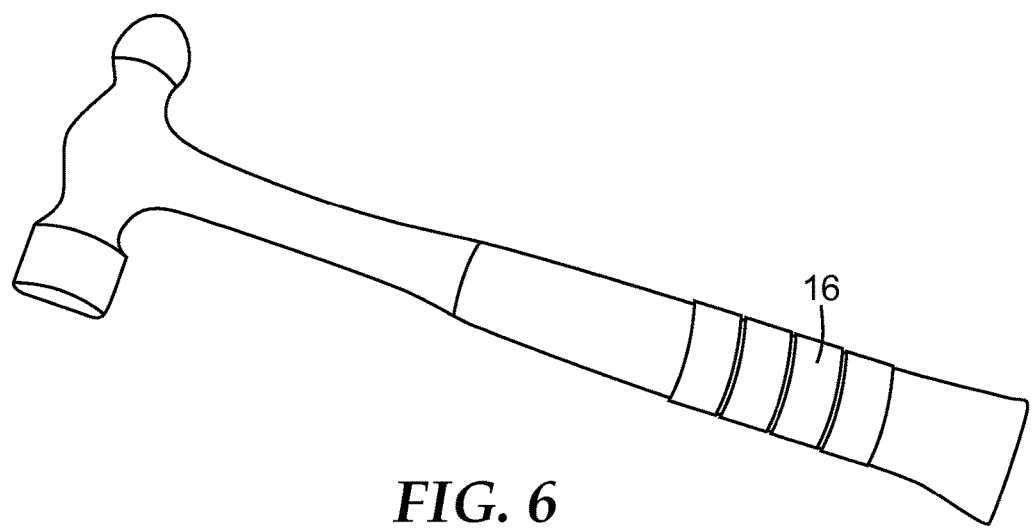
FIG. 6 depicts an embodiment of a self-adhering grip tape, wrapped around a handle of a hammer.

The tape is particularly useful as a self-adhering tape. In one embodiment, the tape is suitable for use as a grip tape. FIG. 6 depicts the tape wrapped around a handle of a hammer. In FIG. 6, a typical spiral wrap, with a single continuous length of self-adhering tape, is shown, with both the beginning and terminal ends of the single continuous length of self-adhering tape being hidden from view on the side of the hammer handle away from the viewer. It will be understood that wrapping with two or more separate lengths of self-adhering tape is contemplated, and that wrapping methods other than simple spiral wrapping are also contemplated, especially for more complex surfaces.

The surface (12 or 13) of outer layer 16 typically has a coefficient of friction of at least 0.5 for use as a grip tape.

In another embodiment, the tape is suitable for use as an electrical tape. The coefficient of friction may be less than 0.5 for electrical tapes. However, the dielectric break down voltage is at least 500 volts.

In another embodiment, the adhesive layer may comprise a thermoplastic composition having a low level of tack, yet a relatively low melting point or softening temperature such that the adhesive layer can be thermally fused to the outer layer. In this embodiment, the tape may be free of a release layer, as depicted in FIG. 4.

As used herein, "tape" refers to piece of material comprising an adhesive layer that can be adhered to itself after being wrapped to an article and/or can be directly adhered to an article. In typical embodiments, the tape may be a relatively narrow continuous strip of material. However, the tape may also be a pre-cut piece of material. For example, in the case of hand railings, it may be desirable to adhere a strip of grip tape only to the top surface of the railing rather than wrapping the entire circumference of the railing.

Each layer of the tape of the invention can be of the same or different thickness as the other layers. While the precise thickness of these layers is not crucial to the invention, each layer is commonly at least 1 mil (25 micrometers) thick and no greater than 20 mils (500 micrometers thick). Typically, the substrate layer is the thickest layer and provides the strength and elongation properties to the tape. In some embodiments, the substrate layer is at least 2, 3, 4, or 5 mils and no greater than 15, 16, 17, 18, 19, or 20 mils. The adhesive layer and outer layer typically have a thickness less than the substrate layer. For example, each of these layers may independently have a thickness of at least 1, 2, or 3 mils and no greater than 10, 9, or 8 mils.

The adhesive layer, substrate layer, and outer layer each comprise a polyolefin polymer. Polyolefin polymers are lower in cost than silicone-containing self-fusing tapes. Thus in preferred embodiments, each of the layers are free of silicone (e.g. polyorgansiloxane).

The adhesive layer and outer layer typically independently comprise a polyolefin polymer comprising at least 50 wt-% of ethylene, propylene, or combinations thereof. The polyolefin polymer of the adhesive layer and outer layer further comprises one or more $C_4$-$C_{20}$ α-olefin, typically in an amount of at least 20, 25, 30, 35, 40, or 45 wt-%. In some embodiments, the adhesive layer and outer layer independently comprise a $C_2$-$C_3$ alkylene/α-olefin interpolymer which is defined herein as an interpolymer of ethylene, propylene, or a combination thereof and at least one $C_4$-$C_{20}$ α-olefin. In some embodiments, the polyolefin polymer is an ethylene/α-olefin interpolymer or a propylene/α-olefin interpolymer.

The adhesive may alternatively comprise other polyolefin polymers such as a polyisobutylene (e.g. lacking ethylene and or propylene) or a polyalphaolefin polymer having less than 50 wt-% of ethylene, propylene, or combinations thereof.

The substrate layer may also comprise a $C_2$-$C_3$ alkylene/α-olefin interpolymer or alternatively another "film grade" polyolefin such as low density polyethylene, ultra low density polyethylene, low density polypropylene, and ultra low density polypropylene.

The $C_2$-$C_3$ alkylene/α-olefin interpolymer is an interpolymer of ethylene, propylene, or a combination thereof, with at least one comonomer selected from $C_4$-$C_{20}$ α-olefins. The term "interpolymer" is used herein to indicate a random copolymer or a block copolymer, inclusive of grafted copolymers. Copolymer refers to a polymer prepared from at least two different alkylene monomers.

In some embodiments, the $C_2$-$C_3$ alkylene/α-olefin interpolymer may further comprise other comonomers such as non-conjugated dienes and cycloalkenes. Exemplary $C_4$-$C_{20}$ α-olefins include isobutylene, 1-butene, 1-hexene, 4-methyl-1-pentene, 1-heptene, and 1-octene. Preferred $C_4$-$C_{20}$ α-olefins include 1-butene, 1-hexene, 4-methyl-1-pentene, 1-heptene, and 1-octene, more preferably 1-hexene and 1-octene. Exemplary cycloalkenes include cyclopentene, cyclohexene and cyclooctene. The non-conjugated dienes suitable as comonomers, particularly in the making of $C_2$-$C_3$ alkylene/α-olefin/diene terpolymers, are typically non-conjugated dienes having from 6 to 15 carbon atoms. Representative examples of suitable non-conjugated dienes include: (a) Straight chain acyclic dienes such as 1,4-hexadiene; 1,5-heptadiene; and 1,6-octadiene; (b) Branched chain acyclic dienes such as 5-methyl-1,4-hexadiene; 3,7-dimethyl-1,6-octadiene; and 3,7-dimethyl-1,7-octadiene; (c) Single ring alicyclic dienes such as 4-vinyl cyclohexene; 1-allyl-4-isopropylidene cyclohexane; 3-allyl cyclopentene; 4-allyl cyclohexene; and 1-isopropenyl-4-butenylcyclohexene; (d) Multi-ring alicyclic fused and bridged ring dienes such as dicyclopentadiene; alkenyl, alkylidene, cycloalkenyl, and cycloalkylidene norbornenes, such as 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; and 5-cyclohexylidene-2-norbornene.

In some embodiments, the interpolymer is a homogeneous linear or substantially linear $C_2$-$C_3$ alkylene/α-olefin interpolymer. By the term "homogeneous", it is meant that any comonomer is randomly distributed within a given interpolymer molecule and substantially all of the interpolymer molecules have the same ethylene/comonomer ratio or propylene/comonomer within that interpolymer. The melting peak of homogeneous linear and substantially linear $C_2$-$C_3$ alkylene/α-olefin interpolymers, as obtained using differential scanning calorimetry, will broaden as the density decreases and/or as the number average molecular weight decreases. However, unlike heterogeneous polymers, when a homogeneous polymer, prepared in a solution polymerization process, has a melting peak greater than 115° C. (such as is the case of polymers having a density greater than 0.940 g/cm³), it does not additionally have a distinct lower temperature melting peak.

Substantially linear $C_2$-$C_3$ alkylene/α-olefin interpolymers are homogeneous interpolymers having long chain branching. Due to the presence of such long chain branching, substantially linear $C_2$-$C_3$ alkylene/α-olefin interpolymers are further characterized as having a melt flow ratio which may be varied independently of the polydispersity index, and the like, the molecular weight distribution $M_w/M_n$. This feature accords substantially linear $C_2$-$C_3$ alkylene/α-olefin interpolymers with a high degree of processability despite a narrow molecular weight distribution.

The long chain branches of substantially linear $C_2$-$C_3$ alkylene/α-olefin interpolymers have the same comonomer distribution as the interpolymer backbone and can be as long as about the same length as the length of the interpolymer backbone. When a substantially linear $C_2$-$C_3$ alkylene/α-olefin interpolymer is employed, such interpolymer will be characterized as having an interpolymer backbone substituted with from 0.01 to 3 long chain branches per 1000 carbons.

Methods for determining the amount of long chain branching present, both qualitatively and quantitatively, are known in the art by test methods such as Nuclear Magnetic Resonance.

Homogeneous $C_2$-$C_3$ alkylene/α-olefin interpolymers differ from amorphous polyolefins also described as amorphous polyalphaolefins (APAO), with regard to homogeneity, molecular weight distribution ($M_w/M_n$), as well as comonomer (α-olefin) content. Amorphous polyolefins are homopolymers, copolymers and terpolymers of $C_2$-$C_8$ α-olefins that are typically polymerized by means of processes which employ Ziegler-Natta catalysts, resulting in a relatively broad molecular weight distribution, typically greater than 4. In contrast, the homogeneous $C_2$-$C_3$ alkylene/α-olefin interpolymers are characterized as having a narrow molecular weight distribution. The homogeneous $C_2$-$C_3$/alkylene α-olefin interpolymers have a $M_w/M_n$ of less than 4, or less than 3. In some embodiments, $M_w/M_n$ ranges from 1.5 to 2.5 or ranges from 1.8 to 2. Further, whereas amorphous polyolefins produced from Ziegler-Natta catalysis typically have an α-olefin concentration greater than 50 wt-%, homogeneous $C_2$-$C_3$ alkylene/α-olefin interpolymers are predominantly ethylene and/or propylene, having a greater $C_2$-$C_3$ alkylene content than comonomer content.

It is also noted that substantially linear interpolymers differ from low density polyethylene prepared in a high pressure process. In one regard, whereas low density polyethylene is an ethylene homopolymer having a density of from 0.900 to 0.935 g/cm$^3$, the homogeneous linear and substantially linear ethylene/α-olefin interpolymer include the presence of a comonomer to reduce the density.

According to the literature, homogeneously branched linear ethylene/α-olefin interpolymers may be prepared using polymerization processes (for example, as described by Elston in U.S. Pat. No. 3,645,992) which provide a homogeneous short chain branching distribution. In his polymerization process, Elston uses soluble vanadium catalyst systems to make such polymers. However, others such as Mitsui Petrochemical Company and Exxon Chemical Company have used so-called single site catalyst systems to make polymers having a homogeneous linear structure. U.S. Pat. No. 4,937,299 to Ewen et al. and U.S. Pat. No. 5,218,071 to Tsutsui et al. disclose the use of catalyst systems based on hafnium for the preparation of homogeneous linear ethylene polymers. Homogeneous linear ethylene/α-olefin interpolymers are currently available from Mitsui Petrochemical Company under the trade name "Tafmer" and from Exxon Chemical Company under the trade name "Exact".

Substantially linear ethylene/α-olefin interpolymers are available from the Dow Chemical Company as Affinity™ polyolefin plastomers and Engage™ and Infuse™ polyolefin elastomers. Substantially linear ethylene/α-olefin interpolymers may be prepared in accordance with the techniques described in U.S. Pat. No. 5,272,236 and in U.S. Pat. No. 5,278,272.

The substrate layer comprises a "film grade" polyolefin polymer. Film grade polyolefin polymers typically have a melt flow index of at least 0.25, or 0.50, or 1.0, or 1.5 g/10 min., and in some embodiments at melt flow index of at least 2, 3, 4, 5, 6, 7, 8, 9, or 10 g/10 min. Although the adhesive may comprise a polylolefin polymer having a melt index greater than 100 g/10 min, in some embodiments, the substrate layer and outer layer typically comprise a (e.g. homogeneous $C_2$-$C_3$ alkylene/α-olefin interpolymer) polyolefin polymer having a melt flow index no than about 100 g/10 min., or 50 g/10 min, or 30 g/10 min., or 20 g/10 min. Film grade polyolefin polymers typically have a weight average molecular weight of at least 50,000 gram/mole, or 75,000 g/mole or 100,000 g/mole as measured by GPC. Typically the weight average molecular weight is no greater than 500,000 or 400,000 g/mole.

The density of the polyolefin polymer, such as the (e.g. homogeneous) $C_2$-$C_3$ alkylene/α-olefin interpolymer, will be selected on the basis of the desired performance attributes of the layer. Typically, the polyolefin polymer, such as the (e.g. homogeneous) $C_2$-$C_3$ alkylene/α-olefin interpolymer, utilized for the adhesive layer and outer layer independently have a density of at least 0.84, or 0.845, or 0.850 g/cm$^3$ and no greater than about 0.880 g/cm$^3$, or 0.875 g/cm$^3$, or 0.870 g/cm$^3$. These lower density interpolymers comprise higher α-olefin contents. For example the α-olefin (e.g. octene) content can be at least 35, 40 or even 45 wt-%, yet is typically less than 50 wt-%. Thus, the ethylene, propylene, or combination of ethylene and propylene of the polyolefin polymer is typically at least 50, 55, 60, or 65 wt-%. The adhesive layer may comprise the same or other lower density film grade (e.g. homogeneous) $C_2$-$C_3$ alkylene/α-olefin interpolymer as the outer layer.

When the polyolefin polymer, such as the $C_2$-$C_3$ alkylene/α-olefin interpolymer, of the outer layer or adhesive layer comprises little or no additives, the outer layer or adhesive layer comprise the same or about the same density as the polymer. However, when the outer layer and particularly the adhesive comprise other components, the density may be greater than or less than the polymer.

In some embodiments, the polyolefin polymer, such as the (e.g. homogeneous) $C_2$-$C_3$ alkylene/α-olefin interpolymer, utilized for the adhesive layer and outer layer has a relatively low melting point or softening temperature. For example, the DSC melt point may be at least 85 or 90° F. and no greater than 120° F. or 115° F., or 110° F., or 105° F. In some embodiments, the polyolefin polymer, such as the (e.g. homogeneous) $C_2$-$C_3$ alkylene/α-olefin interpolymer, utilized for the adhesive layer and outer layer has a tensile strength less than the substrate layer. For example, the tensile strength according to ASTMD638 (508 mm/min) may be at least 100 or 200 psi, yet no greater than 500, or 400 psi. In some embodiments, the polyolefin polymer, such as the (e.g. homogeneous) $C_2$-$C_3$ alkylene/α-olefin interpolymer, utilized for the adhesive layer and outer layer has an elongation at break greater than the substrate layer. For example, the elongation at break according to ASTMD638 may be at least 700% or 800% or 900%.

The polyolefin utilized for the substrate layer preferably has a density selected based on the elasticity and toughness requirement of the tape. Lower density will result in higher elasticity and less toughness whereas higher density will result in lower elasticity and higher toughness upon stretching in application. In some embodiments, the substrate layer has a higher density than the (e.g. $C_2$-$C_3$ alkylene /α-olefin interpolymer) polyolefin polymer of the adhesive layer and/or the outer layer. In some embodiments, the difference in density between the substrate layer and the adhesive layer and/or the outer layer is at least 0.20, or 0.25, or 0.30, or even 0.35.

The substrate layer typically comprises a polyolefin polymer, such as (e.g. homogeneous) $C_2$-$C_3$ alkylene/α-olefin interpolymer, having a density of at least 0.880 g/cm$^3$, or 0.885, or 0.890 g/cm$^3$, or 0.895 g/cm$^3$. When the substrate layer comprises other polyolefin film grade materials, as previously described, the density may be even greater than 0.895 g/cm$^3$. Further, a $C_2$-$C_3$ alkylene/α-olefin interpolymer having a density less than 0.880 g/cm$^3$ can be blended with a higher density polyolefin. In some embodiments, the polyolefin polymer of the substrate layer comprises at high content of ethylene, propylene, or a combination thereof, than the polyolefin of the outer layer and adhesive layer. For example the polyolefin polymer of the substrate layer may comprise ethylene, propylene, or combination thereof in an amount of at least 70, 75, 80, 85, 90 wt-% or greater. The polyolefin polymer of the substrate layer may optionally contain $C_4$-$C_{20}$ α-olefin(s) in amounts of no greater than 30, 25, 20, 15, 10, or 5 wt-% of the polyolefin polymer or the polyolefin polymer of the substrate layer may be substantially free of $C_4$-$C_{20}$ α-olefin(s).

The higher density polyolefins of the substrate, such as the higher density (e.g. homogeneous) $C_2$-$C_3$ alkylene/α-olefin interpolymers, typically have a DSC melting point of at least 160° F. or 170° F., or 180° F., or 190° F., or 200° F. In some embodiments, the polyolefin utilized for the substrate layer has a (machine direction) tensile strength of at least 2000, 3000, 4000, 5000, 6000, or 7000 psi. In some embodiments, the polyolefin utilized for the substrate layer has a (machine direction) elongation of at least 100%, 200%, 300%, 400%, or 500%.

In some embodiments, the substrate, adhesive, and outer layer each comprise a single (e.g. homogeneous) $C_2$-$C_3$ alkylene/α-olefin interpolymer having the density just described. In other embodiments, the substrate, adhesive, and/or outer layer may independently comprise a blend of at least two (e.g. homogeneous) $C_2$-$C_3$ alkylene/α-olefin interpolymers wherein the blend has the density just described.

In other embodiments, the substrate, adhesive, and/or outer layer may independently comprise at least one (e.g. homogeneous) $C_2$-$C_3$ alkylene/α-olefin interpolymer and at least one other polyolefin (such as low density polyethylene or a polyalphaolefin having a broad molecular weight distribution) wherein the blend has the density just described.

The various blends may also comprise the melting point ranges, and/or the tensile strength, and/or the elongation as previously described.

The substrate layer typically comprises a film grade polyolefin polymer as previously described, optionally comprising up to 20 wt-% of additives and/or processing aids.

Various additives and processing aids are known in the art including for example processing aids, antioxidants, stabilizers, ultraviolet absorbers or stabilizers; colorants such as (e.g. titanium dioxide) pigment; and fillers such as calcium carbonate and other inorganic filler materials and well as glass or polymeric beads or bubble. It is appreciated that fillers that comprise encapsulated air can reduce the density of the composition relative to the polyolefin polymer alone.

The outer layer typically comprises a lower density film grade (e.g. homogeneous) $C_2$-$C_3$ alkylene/α-olefin interpolymer as just described, optionally comprising up to 10 wt-% of the same additives and/or processing aids as the substrate layer. The outer layer may additionally comprise up to 5 or 10 wt-% of a tackifying resin. However, in some embodiments, the outer layer comprises less than 5 wt-% of tackifying resin or is substantially free of tackifying resin.

Due at least in part to the relatively low density and higher α-olefin content of the polyolefin, the outer layer can exhibit sufficient adhesion to the adhesive layer such that the tape will stay in placing when the tape is wrapped around an article. However, the adhesion is typically insufficient to maintain the wrapped tape in place for prolonged periods of time. When the interlayer adhesion between the outer layer and adhesive layer is insufficient (e.g. less than 2 psi), the contacting outer and adhesive layers are typically subjected to heat to soften these layers such that these layers thermally fuse together. The wrapped article is heated to the melting point or softening temperature of the outer layer and/or adhesive layer. When the melting point of the (e.g. homogeneous) $C_2$-$C_3$ alkylene/α-olefin interpolymer is sufficiently low as previously described, such heating can conveniently be accomplish by actively heating the wrapped article, such as with a common household blow dryer. Alternatively, when the tape is used as an electrical tape or used for outdoor usage, the wrapped article may be latently heated by its surroundings.

Alternatively, the adhesive layer may comprise a pressure sensitive adhesive wherein the interlayer adhesion between the PSA and outer layer is sufficiently high in the absence of heat. In this embodiment, the interlayer adhesion is typically at least 2 psi and in some embodiments, greater than 10 psi.

The adhesive layer, and especially the pressure sensitive adhesive, may comprise one more homogeneous $C_2$-$C_3$ alkylene/α-olefin interpolymer in combination with a tackifying resin. The polyolefin content inclusive of the homogeneous $C_2$-$C_3$ alkylene/α-olefin interpolymer will typically be present in the adhesive of the invention in an amount of at least 30 wt-%, 40 wt-%, or 50 wt-% up to about 80 or 90 wt-%.

Tackifier resins include hydrocarbon resins, rosins, hydrogenated rosins, rosin esters, polyterpene resins, and other resins. The preferred tackifier resins are hydrocarbon resins derived from olefins and diolefins having five carbon atoms. Examples of commercially available tackifier resins suitable for the pressure-sensitive adhesive layer of this invention are sold under the following trademarks: WINGTACK™ of Goodyear Tire and Rubber Co., PICCOLYTE™ of Hercules, and ESCOREZ™ of Exxon Chemical Company, and Regalite™ and RegalRez™ of Eastman Chemicals.

The composition of each of the layer are selected such that the tape has any one or combination of the following properties as determined according to the test methods described in the examples:

| Properties | Preferred | More preferred |
|---|---|---|
| Coefficient of Friction of Outer Layer to Leather | 0.5-1.5 | >1.5 |
| Elongation at Break of Outer Layer/Substrate Layer/Adhesive Layer | 100-500% | >500% |
| Interfacial Adhesion of Outer Layer/Substrate layer and Substrate Layer/Adhesive | <5% adhesive transfer | No adhesive transfer |
| Self Adhesion of Outer Layer to Adhesive Layer | 2-10 psi | >10 psi |
| Dielectric Break Down Voltage: | 500-5000 volts | >5000 volts |

In some embodiment, the elongation at break of outer layer/substrate layer/adhesive layer is at least 600% or 700% and is typically no greater than 1000%. The self adhesion of the outer layer to the adhesive layer can be at least 15 or 20 psi and in some embodiments at least 25 or 30 psi and is typically no greater than 100 psi. In some embodiments, the self adhesion of the outer layer to the adhesive layer is no greater than 90, 80, 70, or 60 psi. Further in some embodiments, the tape can be unwrapped without leaving adhesive residue on the article.

In some embodiments, the coefficient of friction of the outer layer of the tape is at least 2 or 2.5 or 3 and is typically no greater than 5, 4.5, or 4. This property is especially useful for grip tape. A grip tape can be applied to most any article or surface that comes in contact with a person's hand. Grip tape is typically applied to handles of sporting implements such as bicycles; tennis, squash, racketball and badminton rackets; golf clubs; bats; gloves such as golf gloves and batting gloves; steering wheels, hand railings, ladder rungs (i.e. step on a ladder), medical equipment, etc. Grip tape is also useful for handles of manual tools (e.g. hammers, shovels, etc.) and power tools, as well as gloves worn while using such tools. Grip tape is suitable for industrial switches or valves that are manually turned by hand.

In some embodiments, the dielectric break down voltage of the tape can be at least 10,000, or 15,000, or 20,000 volts and is typically no greater than about 30,000 volts. This property is especially useful for electrical tapes for wrapping wires, cables, etc. comprising electrical wires.

In some embodiments, the tape of the present invention typically comprises at least one release layer. The release layer may be a preformed substrate, commonly referred to as a release liner.

Alternatively, the release layer may be a thermoplastic polymer optionally further comprising a silicone or fluorochemical release additive that is coextruded with the other requisite layers.

The release layer(s), whether provided as pre-formed films or coextruded with other layers during manufacture of the articles of the present invention, can be composed of polymers such as polyesters. Polyesters include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. The term "polymer" when applied to polyesters will be understood to include both polymers and copolymers, as well as polymers or copolymers which may be formed in a miscible blend, for example, by coextrusion or by reaction, including, for example, transesterification. Also included within the term "polyester" are polycarbonates which are derived from the reaction of glycol monomer molecules with esters of carbonic acid, and blends of polycarbonates with copolyesters made from the above comonomers.

Suitable carboxylate monomer molecules for use in forming the carboxylate subunits of the polyester layers include, for example, terephthalic acid; 2,6-naphthalene dicarboxylic acid and isomers thereof; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof, t-butyl isophthalic acid, tri-mellitic acid, sodium sulfonated isophthalic acid; 4,4-biphenyl dicarboxylic acid and isomers thereof; and lower alkyl esters of these acids, such as methyl or ethyl esters. The term "lower alkyl" refers, in this context, to $C_1$-$C_{10}$ straight-chained or branched alkyl groups.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; 2-butyl-2-ethyl-1,3-propane diol; 2,2,4-triethyl-1,3-pentane diol; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene. Polyesters useful as release layer(s) are not particularly limited. Polyethylene terephthalate (PET) and copolymers of PET containing one or more additional carboxylate monomers and/or one or more additional glycol monomers can be advantageously used. Glycol modified PET, "PETG", which typically contains 1,4-cyclohexane dimethanol (CHDM) as a second glycol monomer, can be advantageously used.

When coextruded with other layers of the articles of the present invention, polyesters used for the release layer(s) can be selected so as to be coextrudable at similar temperatures to those required for the materials used for the other coextruded layers. These polyesters can also be selected so as to be capable of being quenched on a casting roll or drum to effectively avoid brittleness due to excessive crystallization. These polyesters can also be selected so as to provide good handling properties to the quenched film. Typically, good handling is ensured if the glass transition temperature, Tg, of the polyester is greater than 25° C., greater than 40° C., greater than 50° C., or even greater than 60° C.

In some embodiments, at least the adhesive layer and outer layer are formed by melt processing. In this embodiment, the substrate layer and/or release layer(s) may be provided as a preformed film. In another embodiment, the adhesive layer, outer layer, and substrate layer are formed by melt processing. In this embodiment, the release layer(s) may be provided as preformed release liner(s). In yet other embodiments, the adhesive layer, outer layer, substrate layer, and at least one or both release layers are formed by melt processing.

The coextrusion method described herein is also suitable for other types of tapes, such as tapes than are not self-adhering and thus lack an outer layer. In this embodiment, the method comprises coextruding the substrate layer, adhesive layer, and release layer. In one embodiment, the method comprises providing a substrate composition comprising a polyolefin polymer, providing an adhesive composition comprising a polyolefin polymer and optionally further comprising a tackifying resin, providing a release composition comprising a polyester polymer; and coextruding the substrate, adhesive, and release compositions to form a multilayer tape wherein the adhesive composition is disposed between the substrate composition and release composition.

As used herein, melt processing means the pumping and shaping of molten material into a structure. One melt processing technique useful in this invention is coextrusion. In the context of this specification, coextrusion means the simultaneous melt processing of multiple molten streams and the combination of such molten streams into a single unified structure, preferably from a single extrusion die. When a single die is used, the streams of molten material are not required to exit the die from a single outlet. The molten streams can be joined together in a feedblock, in the die, or outside the die. If the streams are joined in the die, they can come together upstream of the exit orifice (a common land die) or at the exit orifice (a zero common land die). In all cases, however, the streams are joined or combined together prior to entering the die, or in the die, or in proximity to the outlet of the die. Useful compositions for melt processing are fluid or pumpable at the temperatures used to melt process the tape (e.g. 175° F. to 600° F., about 80° C. to 315° C.). Furthermore these adhesive and substrate compositions preferably do not significantly degrade or gel at the temperatures employed during melt processing. Useful adhesive and substrate compositions also typically have a melt viscosity of from 500 poise to 1,000,000 poise at the extrusion temperature. As used herein, the term melt viscosity means the viscosity of the molten material at the shear rate and processing temperature employed.

The layers can be extruded sequentially or coextruded. See for example, U.S. Pat. Nos. 5,660,992 and 4,379,806; incorporated by reference. A feedblock is used to combine the molten streams into a single flow channel. The distinct layers of each material are maintained at this time because of the laminar flow characteristics of the streams. The feedblock delivers or transports the now unified, molten structure to an extrusion die where it is reduced in height and increased in width so as to provide a relatively thin and wide construction.

The extruders are in effect "pumps" for delivery of the molten streams to the extrusion die. The precise extruder employed is not critical to the process. However, it is understood that the design of the extruder screw will influence the ability of the extruder to provide good melt quality, temperature uniformity, throughput and the like. A number of useful extruders are known and include single and twin screw extruders, batch-off extruders and the like. These extruders are available from a variety of vendors including Davis-Standard Extruders, Inc. (Pawcatuck, Conn.), Black Clawson Co. (Fulton, N. Y.), Berstorff Corp (N.C.), Farrel Corp. (Conn.), Moriyama Mfg. Works, Ltd. (Osaka, Japan).

Other "pumps" may also be employed to deliver the molten streams to the extrusion die. They include drum unloaders, bulk melters, gear pumps, etc. These are available from a variety of vendors, including Graco LTI (Monterey, Calif.), Nordson (Westlake, Calif.), Industrial Machine Manufacturing (Richmond, Va.), Zenith Pumps Div., Parker Hannifin Corp., (N.C.).

Once the molten streams have exited the pump, they are typically transported to the die through transfer tubing and/or hoses. It is preferable to minimize the amount of residence time in the tubing so as to avoid problems of, for example, melt temperature variations. This can be accomplished by a variety of techniques, including minimizing the length of the tubing, providing appropriate temperature control of the tubing, and utilizing static mixers in the tubing to maintain a homogeneous temperature in the tubing.

The use of a feedblock is optional as a variety of coextrusion die systems are known. Thus, for example, multimanifold dies may also be employed. Examples of feedblocks and extrusion dies useful in the invention are the Cloeren "Vane" dies and Cloeren coextrusion feedblocks and multimanifold dies available commercially from The Cloeren Company of Orange, Tex. Such dies are described in, for example, U.S. Pat. Nos. 4,152,387; 4,197,069; 4,600,550; 4,619,802; 4,780,258; and 4,789,513. Other coextrusion dies and feedblocks are available from Extrusion Dies Inc. (Chippewa Falls, Wis.), ER-WE-PA (GA), Egan Machinery Division, John Brown Inc. (NJ), and Welex Inc. (PA).

Certain factors influence the performance of the extrusion process and the bonding strength of the extruded multilayer construction. For uniform layer structure across web width, melt streams should have similar melt viscosity or their difference in molten viscosity should not differ more than 10:1 to obtain reasonably flat layer profile. Interfacial adhesion among the outer layer, the substrate layer and the adhesive layer can be further enhanced by using a feedblock of a relatively long path so the inter-diffusion time at the interphases is maximized. Longer inter-diffusion time in the molten stage can increase the interphase thickness among those layers, leading to increased bonding strength at those interphases. On the other hand, the release layer stream typically has reduced or minimized contact time in the molten stage with either the adhesive layer or the outer layer to minimize the buildup of interphase thickness for improved release property. If some embodiments, the release layer(s) is extruded through a multimanifold die. The flow of release liner stream is in its own manifold to the point of convergence. The manifold can be designed specifically for the rheology of the release layer resin. Also the manifold can be controlled at a different process temperature than the rest of the layers. Multimanifold dies can also be designed with zero common land length so that the materials do not meet until the die lip or exit orifice. Alternatively they can be designed with a short common flow channel. A zero common land would be preferred when molten streams with extreme viscosity differences (e.g., ratio of 400:1+) are employed. For high viscosity differences between release and adhesive layers (e.g., ratio of larger than 10:1), a short common land can be beneficial because of the reduced contact time at high temperature and high pressure which further reduces the bond strength between the release and adhesive layers of the composite tape.

The extrusion die deposits the unified, molten structure onto a chilled cast drum while the second surface of the structure is a free surface (i.e., not in contact with any other solid surface). The molten (e.g. outer) layer is optionally "nipped" between casting wheel and nip roll. The nip roll can be smooth on its surface or it can have structured features that increase the surface roughness. The surface roughness can be as high as 1000 um and as low as 1 um depending on the requirements of the application. Some desired structural patterns may include lines, pyramids, posts, random matte, dots, grooves, squares, and/or hemispheres.

The resulting tape can be wound as an output roll. When the tape has a release liner in contact with the outer layer, the release layer-can be removed such that the tape is wound on the release liner that contacts the adhesive layer. The liner can be recovered and recycled if desired. Alternatively, is some embodiments, both release liners can be removed. Desired widths and/or lengths of the tape can then be cut using techniques known to the art.

In some embodiments, a pre-made release liner is used to contact the surface of a casting wheel and is interposed between the surface of the casting wheel and the molten stream in which adhesive layer is coextruded against the release liner. However, the use of a liner in the process is optional depending on the relative location of the adhesive layer, i.e. air side or wheel side. For example, a molten structure comprising of a release layer, an adhesive layer, and a substrate layer can be deposited directly onto the surface of casting wheel with the substrate layer contacting the casting wheel surface.

The casting wheel is typically maintained at a temperature less than the temperature of the unified molten structure. Typically this is a temperature in the range of from 5 to 100° C., preferably in the range of 20-80° C.

An air knife or electrostatic pinning device may be used to force the molten unified structure against the liner if desired.

Self Adhesion Test:

The tape was cut into 2.54 cm×7.5 cm in strips and two strips are joined by overlapping 2.54 cm section area with the adhesive layer of one strip in contact with the outer layer of the second strip as depicted in FIG. 5. The overlapped strips were either subjected to roller pressure at about 10 psi or self-fused with heat as described in the forthcoming examples. The resulting bond is tested by pulling the two ends in a shear mode using an Instron machine at speed of 10 cm per minute. Even though the sample may not have interfacial failure during the entire test, the resulting force at fracture is still recorded as the minimum bonding strength at the adhesive layer/outer layer interface in pounds per square inch (PSI). Three specimens were tested for each composition and the average recorded.

Dielectric Breakdown Strength of all the tapes is tested according to ASTM D149.

Elongation at Break Test:

The tape was cut into 2.54 cm by 7.5 cm strips. Each strip was loaded in an Instron and tested under tension at a speed of 5 cm per minute. The strain at fracture is recorded as the elongation at break.

Coefficient of Friction (COF) Test:

Coefficients of Friction were measured with an Instron tensile tester. In this document, all coefficients of friction are measured on tapes made to slide with one of their surfaces in contact with the target material surface.

To measure the Coefficient of Friction between hand skin to tape outer layer (Layer 16 in FIG. 1 and FIG. 2), A 2 inch (5.08 cm) wide and 10 inch (25.4 cm) tape material from each example is cut and mounted on a horizontal platform. A 1 inch (2.54 cm) wide by 5 inch (12.7 cm) long animal leather skin is mounted on a special 200 gram "sled" with a 0.97 inch (2.46 cm) radius. The tape specimens are mounted so that the film's machine direction is in the long dimension of each specimen. The sled is placed on the tape surface and pulled with a chain via a pulley by the Instron crosshead at 1.23 cm per minute. At least 4 inches (10.16 cm) of crosshead travel is used.

The coefficient of friction is defined as the ratio of the frictional force to the sled weight. The frictional force is read directly from the Instron force transducer.

EXAMPLE 1

A 3-layer feedblock with ABC construction was used to make this film. Three melt single screw extruders were used to feed the input resins. The first melt extruder was fed with resin available from Dow Chemical Co. (Midland, Mich., USA) under the trade designation ENGAGE 8842 (layer A, the exposed outer layer). The melt train temperatures were 300° F., 420° F., and 450° F. for zone 1, 2, and 3. The second melt extruder was fed with resin available from Dow Chemical Co. (Midland, Mich., USA) under the trade designation AFFINITY 1140G (Layer B, the substrate layer). The melt train temperatures were 400 F, 450 F, and 450 F for zone 1, 2, and 3. The third melt extruder was fed with resin ENGAGE 8842 (Layer C, the adhesive layer). The melt train temperatures were 300 F, 420 F, 450 F for zone 1, 2, and 3. The overall extrusion rates for layer A, B, and C were 5 lbs/hr, 10 lbs/hr, and 5 lbs/hr, respectively. The 3-layer melt was co-extruded through a film die and then cast on a release PET liner through a nip such that the adhesive layer C was in contact with the PET liner. The nip comprised two rolls, one steel and one rubber. The steel roll was facing the layer A and had a matte finish of surface roughness, Ra, of about 100 um. The rubber roll was facing the PET liner film. The PET release liner film is a silicone-coated clear PET film commercially available from SKC Haas (Seoul, Korea) under product name of RS21G. The line speed was controlled such that the resulting cast thickness of layer stack A/B/C was about 20 mils.

The resulting film was applied on a typical hand tool surface, i.e. a screw driver handle, by first peeling off the release liner and then wrapping the layers A/B/C onto the handle surface with Layer C in contact with the handle surface. The wrapped surface was self-fused with heat by warming up the wrapped handle with a hot air gun to about 60-80° C. for about 10-30 seconds.

To test the properties, the adhesive strength for interface A/B, B/C, and C/A (self-fusion) were tested using a 1 square inch tape with proper seal as aforementioned (60-80° C. for about 10-30 seconds) and the adhesive strength is found to be at least 50 psi. The real adhesive bonding strength was expected to be even higher if not due to that fact that the sample arms fractured before interfacial failure at the joint. The electrical insulation character was measured as a break down voltage of 28±2 K volts. A tensile test showed that the tape could be elongated to about 700% before breaking. The grip property was measured according to the coefficient of friction test. The COF was determined to be 2.7±0.2.

In order to test the adhesive residual property, the tape article was then removed from the wrapped tool surface by unwrapping it. No adhesive residual was left on the handle surface, resulting in a clean tool handle surface.

EXAMPLE 2

Example 2 was produced in the same fashion as example 1 except the third melt extruder was fed with a blend of resin ENGAGE 8842 and a hydrocarbon resin REGALREZ 1094 (Eastman Chemical Co, Kingsport, Tenn., USA) at composition ratio of (80 wt/20 wt) (Layer C, the adhesive layer). The line speed was controlled such that the resulting cast thickness of layer stack A/B/C was about 20 mils. The resulting film was applied on a typical hand tool surface, i.e. a screw driver handle, by first peeling off the release liner and then wrapping the layers A/B/C onto the handle surface with Layer C in contact with the handle surface. The wrapped surface was self-fused with heat by warming up the wrapped handle with a hot air gun to about 60-80° C. for about 10-30 seconds.

To test the properties, the adhesive strength for interface A/B, B/C, and C/A (self-fusion) were tested using a 1 square inch tape with proper seal and the adhesive strength is found to be at least 50 psi. The real adhesive bonding strength was expected to be even higher if not due to that fact that the sample arms fractured before interfacial failure at the joint. The electrical insulation character was measured as a break down voltage of 28±2 K volts. A tensile test showed that the tape could be elongated to about 700% before breaking. The grip property was measured according to the coefficient of friction test and determined to be 2.7±0.2.

In order to test the adhesive residual property, the tape article was then removed from the wrapped tool surface by unwrapping it. No adhesive residual was left on the handle surface, resulting in a clean tool handle surface.

EXAMPLE 3

Example 3 was produced in the same fashion as example 1 except the third melt extruder was fed with a blend of resin ENGAGE 8842 and a hydrocarbon resin REGALREZ 1094 (Eastman Chemical Co, Kingsport, Tenn., USA) at composition ratio of (60 wt/40 wt) (Layer C, the adhesive layer). The line speed was controlled such that the resulting cast thickness of layer stack A/B/C was about 20 mils.

The resulting film was applied on a typical hand tool surface, i.e. a screw driver handle, by first peeling off the release liner and then wrapping the layers A/B/C onto the handle surface with Layer C in contact with the handle surface. The wrapped surface self-fused without heat.

To test the properties, the adhesive strength for interface A/B, B/C, and C/A (self-fusion) were tested using a 1 square inch tape with proper seal and the adhesive strength is found to be at least 35 psi. The real adhesive bonding strength was expected to be even higher if not due to that fact that the sample arms fractured before interfacial failure at the joint. The electrical insulation character was measured as a break down voltage of 28±2 K volts. A tensile test showed that the tape could be elongated to about 700% before breaking. The coefficient of friction was in the range of 2.5 to 2.9.

In order to test the adhesive residual property, the tape article was then removed from the wrapped tool surface by unwrapping it. No adhesive residual was left on the handle surface, resulting in a clean tool handle surface.

EXAMPLE 4

Example 4 was produced in the same fashion as example 1 except the third melt extruder was fed with a blend of resin ENGAGE 8842 and a hydrocarbon resin REGALREZ 1094 (Eastman Chemical Co, Kingsport, Tenn., USA) at composition ratio of (40 wt/60 wt) (Layer C, the adhesive layer). The line speed was controlled such that the resulting cast thickness of layer stack A/B/C was about 20 mils.

The resulting film was applied on a typical hand tool surface, i.e. a screw driver handle, by first peeling off the release liner and then wrapping the layers A/B/C onto the handle surface with Layer C in contact with the handle surface. The wrapped surface self-fused without heat.

To test the properties, the adhesive strength for interface A/B, B/C, and C/A (self-fusion) were tested using a 1 square inch tape with proper seal and the adhesive strength is found to be at least 40 psi. The real adhesive bonding strength was expected to be even higher if not due to that fact that the sample arms fractured before interfacial failure at the joint. The electrical insulation character was measured as a break down voltage of 28±2 K volts. A tensile test showed that the tape could be elongated to about 700% before breaking. The coefficient of friction was in the range of 2.7±0.2.

In order to test the adhesive residual property, the tape article was then removed from the wrapped tool surface by unwrapping it. No adhesive residual was left on the handle surface, resulting in a clean tool handle surface.

EXAMPLE 5

Tape Article of Coextruded $D_1ABCD_2$

A 5-layer feedblock with $D_1ABCD_2$ construction was used to make this exemplary film. Four melt extruders were used to feed the input resins. The first melt extruder was a twin screw extruder and was fed with resin PETg, commercially available from Eastman Chemical (Kingsport, Tenn., USA) under trade name EASTAR PETG 6763. The first extruder was connected to the feedblock inlet in such a way as to split the melt stream into two approximately equal portions, so as to provide both the first and last layers of the 5-layer film, release Layers D1 and D2. The two release layers are on the outer-most surfaces for the 5-layer construction. The melt train temperatures were 400 F, 480 F, 500 F for zone 1, 2, and 3. The second melt extruder was a single screw extruder and was fed with resin ENGAGE 8842 (layer A, the "outer layer", which is covered by a release layer D1 in this Example). The melt train temperatures were 400 F, 450 F, and 450 F for zone 1, 2, and 3. The third melt extruder was a twin screw extruder and was fed with resin AFFINITY 1140G (Layer B, the substrate layer). The melt train temperatures were 400 F, 450 F, and 450 F for zone 1, 2, and 3. The fourth melt extruder was a twin screw extruder and was fed with a resin ENGAGE 8842 (Layer C, the adhesive layer). The melt train temperatures were 400 F, 450 F, and 450 F for zone 1, 2, and 3. The overall extrusion rates, for layer A, B, C, and $D_1$ and $D_2$ taken together, were 5 lbs/hr, 10 lbs/hr, 5 lbs/hr, and 20 lbs/hr, respectively. The 5-layer melt was co-extruded through a film die and then cast on a chilled drum for cooling. The line speed was controlled such that the resulting cast thickness of the center layer stack A/B/C after peeling off $D_1$ and $D_2$ release liners was about 20 mils.

The resulting film was applied on a typical hand tool surface, i.e. a screw driver handle, by first peeling off both of the layers D1 and D2 and then wrapping the layers A/B/C onto the handle surface with Layer C in contact with the handle surface. The wrapped surface was self-fused with heat by warming up the wrapped handle with a hot air gun at about 60-80° C. for about 10-30 seconds.

To test the properties, the adhesive strength for interface A/B, B/C, and C/A (self-fusion) were tested using a 1 square inch tape with proper seal and the adhesive strength is found to be at least 40 psi. The real adhesive bonding strength was expected to be even higher if not due to that fact that the sample arms fractured before interfacial failure at the joint. The electrical insulation character was measured as a break down voltage of 28±2K volts. A tensile test showed that the tape to have an elongation at break of 700%. The coefficient of friction was in the range of 2.5±0.2.

In order to test the adhesive residual property, the tape article was then removed from the wrapped tool surface by unwrapping it. No adhesive residual was left on the handle surface, resulting in a clean tool handle surface.

EXAMPLE 6

Tape Article of Coextruded $D_1ABCD_2$

Example 6 was produced in the same fashion as example 5 except the fourth melt extruder was fed with a blend of resin ENGAGE 8842 and a hydrocarbon resin REGALREZ 1094 (Eastman Chemical Co, Kingsport, Tenn., USA) at composition ratio of (80 wt/20 wt) (Layer C, the adhesive layer). The line speed was controlled such that the resulting cast thickness of layer stack A/B/C after peeling off D1 and D2 was about 20 mils.

The resulting film was applied on a typical hand tool surface, i.e. a screw driver handle, by first peeling off both of the layers $D_1$ and $D_2$ and then wrapping the layers A/B/C onto the handle surface with Layer C in contact with the handle surface. The wrapped surface was self-fused with heat by warming up the wrapped handle with a hot air gun at about 60-80° C. for about 10-20 seconds.

To test the properties, the adhesive strength for interface A/B, B/C, and C/A (self-fusion) were tested using a 1 square inch tape with proper seal and the adhesive strength is found to be at least 35 psi. The real adhesive bonding strength was expected to be higher if not due to that fact that the sample arms fractured before interfacial failure at the joint. The electrical insulation character was measured as a break down voltage of 28±2 K volts. A tensile test showed that the tape could be elongated to about 700% before breaking. The coefficient of friction was 2.5±0.2.

In order to test the adhesive residual property, the tape article was then removed from the wrapped tool surface by unwrapping it. No adhesive residual was left on the handle surface, resulting in a clean tool handle surface.

CONTROL EXAMPLE 1

Acrylic Adhesive Layer

Control Example 1 was produced in the same fashion as example 1 except the third melt extruder was fed with a soft acrylic resin Kurarity LA2250 (Kuraray America Inc, Houston, Tex., USA) (Layer C, the adhesive layer). The line speed was controlled such that the resulting cast thickness of layer stack A/B/C was about 20 mils.

The resulting film was applied on a typical hand tool surface, i.e. a screw driver handle, by first peeling off the release liner and then wrapping the layers A/B/C onto the handle surface with Layer C in contact with the handle surface. The wrapped surface self-fused without heat. The resulting wrapped tool handle had excellent electrical and grip properties.

To test the properties, the adhesive strength for interface A/B, B/C, and C/A (self-fusion) were tested using a 1 square inch tape with proper seal and the adhesive strength is found to be 1.5 psi with failure at the interface between layer B and layer C. In order to test the adhesive residual property, the tape article was then removed from the wrapped tool surface by unwrapping it. Adhesive residual was left on the handle surface due to interfacial de-bonding between layer B and layer C.

CONTROL EXAMPLE 2

Acrylic Outer Layer

Control Example 2 was produced in the same fashion as example 4 except the first melt extruder was fed with a soft acrylic resin Kurarity LA2250 (Kuraray America Inc, Houston, Tex., USA) (Layer A, the exposed outer layer). The line speed was controlled such that the resulting cast thickness of layer stack A/B/C was about 20 mils.

The resulting film was applied on a typical hand tool surface, i.e. a screw driver handle, by first peeling off the release liner and then wrapping the layers A/B/C onto the handle surface with Layer C in contact with handle surface. The wrapped surface self-fused without heat. The resulting wrapped tool handle has excellent electrical and grip properties.

To test the bonding properties, the adhesive strength for interface A/B, B/C, and C/A (self-fusion) were tested using a 1 square inch tape with proper seal and the bonding strength is found to be 1.5 psi with failure at the interface between layer A and layer B. In order to test the adhesive residual property, the tape article was then removed from the wrapped tool surface by unwrapping it. Adhesive residual was left on the handle surface due to interfacial de-bonding between layer A and layer B.

What is claimed is:

1. A self-adhering tape comprising:
a polyolefin substrate layer having a first major surface and opposing major surface;
an adhesive layer disposed on the first major surface of the polyolefin substrate, an outer layer disposed on the opposing major surface of the polyolefin substrate, the outer layer and adhesive layer independently comprising a polymer comprising at least 50 wt-% of $C_2$-$C_3$ alkylene and at least 20 wt-% $C_4$-$C_{20}$ α-olefin having a density less than 0.88 g/cc or 0.87 g/cc, wherein the adhesive layer and outer layer self-adheres such that the peel force to separate the adhesive layer from the outer layer ranges from 2 psi to 100 psi.

2. The self-adhering tape of claim 1 wherein the outer layer has a coefficient of friction to leather of at least 0.5 and no greater than 5.0.

3. The self-adhering tape of claim 1 wherein the substrate layer comprises a polyolefin polymer or blend of polyolefin polymers having a density of at least 0.88 g/cc or 0.89 g/cc.

4. The self-adhering tape of claim 1 wherein the substrate layer comprises a $C_2$-$C_3$ alkylene/α-olefin interpolymer.

5. The self-adhering tape of claim 1 wherein the adhesive layer further comprises tackifying resin.

6. The self-adhering tape of claim 1 wherein the adhesive layer, substrate layer, and outer layer are coextruded.

7. The self-adhering tape of claim 1 wherein the outer layer has a smooth surface layer.

8. The self-adhering tape of claim 1 wherein the outer layer has a surface layer having an average surface roughness ranging from 1 um to 1000 um.

9. The self-adhering tape of claim 1 wherein the outer layer is covered with a removable release layer.

10. The self-adhering tape of claim 1 wherein the adhesive layer is covered with a removable release layer.

11. The self-adhering tape of claim 9 wherein the removable release liner comprises a polyester polymer optionally containing a fluorocarbon or silicone release additive.

12. The self-adhering tape of claim 9 wherein the one or both of the release layer(s) are coextruded.

13. The self-adhering tape of claim 1 wherein the tape has an elongation at break of 100% to 700%.

14. The self-adhering tape of claim 13 wherein the tape has an elongation at break of at least 500%.

15. The self-adhering tape of claim 1 wherein the dielectric break down voltage is at least 500 volts.

16. The self-adhering tape of claim 1 wherein the tape is suitable for use as a grip tape or electrical tape.

* * * * *